(12) United States Patent
Truscott

(10) Patent No.: US 10,908,580 B2
(45) Date of Patent: Feb. 2, 2021

(54) DEVICES, SYSTEMS, AND METHODS FOR AUTOMATED LOADING BRIDGE POSITIONING USING SHAPES ASSOCIATED WITH A VEHICLE

(71) Applicant: Accenture Global Solutions Limited, Dublin (IE)

(72) Inventor: Andrew J. Truscott, Spring, TX (US)

(73) Assignee: Accenture Global Solutions Limited, Dublin (IE)

( * ) Notice: Subject to any disclaimer, the term of this patent is extended or adjusted under 35 U.S.C. 154(b) by 152 days.

(21) Appl. No.: 15/788,315

(22) Filed: Oct. 19, 2017

(65) Prior Publication Data

US 2018/0074474 A1 Mar. 15, 2018

Related U.S. Application Data

(63) Continuation-in-part of application No. 15/686,408, filed on Aug. 25, 2017, now Pat. No. 10,613,507.

(51) Int. Cl.
*G05B 19/12* (2006.01)
*G05B 19/29* (2006.01)
(Continued)

(52) U.S. Cl.
CPC .......... *G05B 19/124* (2013.01); *B64F 1/3055* (2013.01); *G05B 19/29* (2013.01);
(Continued)

(58) Field of Classification Search
CPC ................ G05F 19/124; G05F 19/29; G05F 2219/45071; G05F 19/042; G05F 2219/40538; B64F 1/3005; B64F 1/305
See application file for complete search history.

(56) References Cited

U.S. PATENT DOCUMENTS 3,538,529 A * 11/1970 Breier ................... B64F 1/3055
14/71.5
3,581,331 A * 6/1971 Fisher et al. .......... B64F 1/3055
14/71.5
(Continued)

FOREIGN PATENT DOCUMENTS

CN 1498390 A 5/2004
CN 1639003 A 7/2005
(Continued)

OTHER PUBLICATIONS

Aero News Network, "Passenger Bridge On Auto, Mr. Sulu", http://www.aero-news.net/index.cfm?do=main.textpost&id=ce1db870-5cb7-4606-b6bc-c9681b10d2f6, Aug. 27, 2004, 3 pages.
(Continued)

*Primary Examiner* — Mohammad Ali
*Assistant Examiner* — Kelvin Booker
(74) *Attorney, Agent, or Firm* — Harrity & Harrity, LLP

(57) ABSTRACT

A device may receive one or more images that depict one or more shapes associated with a first object that includes a portal. The device may identify, based on the one or more images, one or more characteristics of the one or more shapes. The device may determine, based on the one or more characteristics of the one or more shapes, one or more attributes of the portal. The device may determine, based on the one or more attributes of the portal, positioning information to be used to position a second object relative to the portal of the first object. The device may output, based on the positioning information, one or more control signals associated with positioning the second object relative to the portal.

20 Claims, 12 Drawing Sheets

Related U.S. Application Data which is a continuation of application No. 15/260,887, filed on Sep. 9, 2016, now Pat. No. 9,746,846.

(51) Int. Cl.
*B64F 1/30* (2006.01)
*B64F 1/305* (2006.01)
*G05B 19/042* (2006.01)

(52) U.S. Cl.
CPC .. *G05B 19/042* (2013.01); *G05B 2219/40538* (2013.01); *G05B 2219/45071* (2013.01)

(56) References Cited

U.S. PATENT DOCUMENTS

| | | | | |
|---|---|---|---|---|
| 3,599,262 | A * | 8/1971 | Carder | B65G 69/24 14/71.5 |
| 3,683,440 | A * | 8/1972 | Xenakis | B64F 1/3055 14/71.5 |
| 3,703,737 | A * | 11/1972 | Eggert, Jr. | B64F 1/305 135/115 |
| 3,724,015 | A * | 4/1973 | Japes | B64F 1/305 104/71 |
| 3,747,147 | A * | 7/1973 | Weese | B64F 1/305 14/71.5 |
| 3,808,626 | A * | 5/1974 | Magill | B64F 1/3055 14/71.5 |
| 3,893,576 | A * | 7/1975 | Casady | A61G 3/06 414/541 |
| 4,357,860 | A * | 11/1982 | Krzak | B64F 1/305 138/120 |
| 4,852,197 | A * | 8/1989 | Thomas, Jr. | B64F 1/3055 14/71.5 |
| 5,004,188 | A * | 4/1991 | Donneky | B64F 1/3055 244/137.2 |
| 5,105,495 | A * | 4/1992 | Larson | B64F 1/305 14/71.5 |
| 5,226,204 | A * | 7/1993 | Schoenberger | E01D 15/24 14/71.5 |
| 5,257,431 | A * | 11/1993 | Larson | B64F 1/305 14/71.5 |
| 5,267,368 | A * | 12/1993 | Saunders | B64F 1/305 135/132 |
| 5,295,212 | A * | 3/1994 | Morton | G02B 6/3886 244/131 |
| 5,524,318 | A * | 6/1996 | Thomas | B64F 1/305 14/72.5 |
| 5,761,757 | A * | 6/1998 | Mitchell | B64F 1/305 14/69.5 |
| 5,775,232 | A * | 7/1998 | Golemis | B61D 23/025 105/458 |
| 5,791,003 | A * | 8/1998 | Streeter | B64F 1/305 14/71.5 |
| 6,122,789 | A * | 9/2000 | Stephenson | B64F 1/3055 14/71.1 |
| 6,182,843 | B1 * | 2/2001 | Tax | B66C 13/46 212/274 |
| 6,330,726 | B1 * | 12/2001 | Hone | B64F 1/305 14/69.5 |
| 6,487,743 | B1 * | 12/2002 | Nicoletti | B64F 1/305 14/71.3 |
| 6,543,076 | B1 * | 4/2003 | Worpenberg | B64F 1/305 14/69.5 |
| 6,704,963 | B1 * | 3/2004 | Hutton | B64F 1/305 14/71.5 |
| 6,745,423 | B1 * | 6/2004 | Hutton | B64F 1/3055 14/71.5 |
| 6,993,802 | B1 * | 2/2006 | Hone | B64F 1/305 14/69.5 |
| 7,168,119 | B1 * | 1/2007 | Telford | B64F 1/3055 14/71.5 |
| 7,428,765 | B2 * | 9/2008 | Hutton | B64F 1/305 14/71.3 |
| 7,458,122 | B2 | 12/2008 | Hutton | |
| 8,074,315 | B2 * | 12/2011 | Okahira | B64F 1/3055 14/71.5 |
| 8,806,690 | B1 * | 8/2014 | Keith | B64F 1/3055 114/362 |
| 8,879,822 | B2 | 11/2014 | Matsumoto | |
| 9,014,956 | B2 * | 4/2015 | Breuing | G08G 1/167 701/120 |
| 9,066,737 | B2 | 6/2015 | Barwinkel et al. | |
| 9,067,692 | B2 * | 6/2015 | Karasek | B64F 1/3055 |
| 9,746,846 | B1 * | 8/2017 | Truscott | G05B 19/124 |
| 2002/0017002 | A1 * | 2/2002 | Sloan | B64F 1/305 14/71.1 |
| 2002/0100128 | A1 * | 8/2002 | Tholen | B64F 1/3055 14/69.5 |
| 2002/0104176 | A1 * | 8/2002 | Thomas | B64F 1/305 14/71.5 |
| 2002/0116771 | A1 * | 8/2002 | Coles | B64F 1/305 14/71.5 |
| 2003/0074749 | A1 * | 4/2003 | Smith | B64F 1/305 14/2.6 |
| 2003/0120358 | A1 * | 6/2003 | Hutton | B64F 1/3055 700/13 |
| 2003/0136898 | A1 | 7/2003 | Oki et al. | |
| 2003/0145402 | A1 * | 8/2003 | Hutton | B64F 1/3055 14/71.5 |
| 2003/0145404 | A1 * | 8/2003 | Hutton | B64F 1/3055 14/71.5 |
| 2003/0189134 | A1 * | 10/2003 | Konya | B64F 1/305 244/137.2 |
| 2003/0189135 | A1 * | 10/2003 | Konya | B64F 1/305 244/137.2 |
| 2003/0208861 | A1 * | 11/2003 | Hutton | B64F 1/3055 14/71.5 |
| 2003/0229955 | A1 * | 12/2003 | Savage | B64F 1/3055 14/71.5 |
| 2004/0019984 | A1 * | 2/2004 | Hutton | B64F 1/002 14/71.5 |
| 2004/0088805 | A1 * | 5/2004 | Hansen | B64F 1/305 14/71.5 |
| 2004/0118975 | A1 * | 6/2004 | Greaves | B64F 1/30 244/114 R |
| 2004/0148716 | A1 * | 8/2004 | Hutton | B64F 1/3055 14/71.5 |
| 2004/0172776 | A1 * | 9/2004 | Hutton | B64F 1/3055 14/71.5 |
| 2004/0187234 | A1 * | 9/2004 | Hutton | B64F 1/3055 14/71.5 |
| 2004/0211014 | A1 * | 10/2004 | Larson | B64F 1/30 14/71.1 |
| 2005/0158157 | A1 * | 7/2005 | Hutton | B64F 1/305 414/373 |
| 2005/0198750 | A1 * | 9/2005 | Spencer | B64F 1/002 14/71.5 |
| 2006/0070193 | A1 * | 4/2006 | Hutton | B64F 1/305 14/71.5 |
| 2006/0163432 | A1 * | 7/2006 | McCoskey | B64C 25/405 244/137.1 |
| 2006/0174429 | A1 * | 8/2006 | Koch | B64F 1/305 14/71.7 |
| 2006/0243534 | A1 * | 11/2006 | Miller | B66B 13/301 187/313 |
| 2006/0277699 | A1 * | 12/2006 | Hutton | B64F 1/305 14/71.5 |
| 2006/0287780 | A1 * | 12/2006 | Hutton | B64F 1/305 701/3 |
| 2006/0288502 | A1 * | 12/2006 | Hutton | B64F 1/305 14/71.5 |
| 2006/0288503 | A1 * | 12/2006 | Hutton | B64F 1/305 14/71.5 |
| 2007/0007389 | A1 * | 1/2007 | McCoskey | B64F 1/31 244/118.5 |
| 2007/0007391 | A1 * | 1/2007 | McCoskey | B64F 1/305 244/136 |
| 2007/0040063 | A1 * | 2/2007 | McCoskey | B64C 25/405 244/114 R |

(56) References Cited

U.S. PATENT DOCUMENTS

| | | | |
|---|---|---|---|
| 2007/0084001 A1* | 4/2007 | Anderberg | B64F 1/3055 14/71.5 |
| 2007/0101520 A1* | 5/2007 | Hutton | B64F 1/305 14/71.3 |
| 2007/0119003 A1* | 5/2007 | Hutton | B64F 1/305 14/71.5 |
| 2007/0214584 A1* | 9/2007 | Hutton | B64F 1/002 14/71.5 |
| 2007/0214585 A1* | 9/2007 | Hutton | B64F 1/002 14/73.5 |
| 2007/0289074 A1* | 12/2007 | Muller | B64F 1/305 14/71.3 |
| 2008/0060145 A1* | 3/2008 | Hutton | B64F 1/3055 14/71.5 |
| 2008/0065271 A1* | 3/2008 | Hutton | B64F 1/3055 701/1 |
| 2008/0098537 A1* | 5/2008 | Hutton | B64F 1/305 14/71.5 |
| 2008/0098538 A1* | 5/2008 | Hutton | B64F 1/3055 14/71.5 |
| 2008/0098539 A1* | 5/2008 | Hutton | B64F 1/3055 14/71.5 |
| 2008/0109970 A1* | 5/2008 | Hutton | B64F 1/002 14/71.5 |
| 2008/0231472 A1* | 9/2008 | Hutton | G08G 5/065 340/958 |
| 2009/0139039 A1* | 6/2009 | Saito | B64F 1/305 14/71.1 |
| 2009/0205145 A1* | 8/2009 | Okahira | B64F 1/305 14/71.3 |
| 2009/0217468 A1* | 9/2009 | Anderberg | B64F 1/3055 14/71.5 |
| 2010/0257790 A1* | 10/2010 | Kim | B64F 1/3055 52/2.12 |
| 2011/0232010 A1* | 9/2011 | Peterson | B64F 1/305 14/71.1 |
| 2011/0309198 A1* | 12/2011 | Scharf | B64F 1/3055 244/137.2 |
| 2013/0247310 A1* | 9/2013 | Bonvila Bonet | B64F 1/3055 14/71.1 |
| 2015/0008286 A1* | 1/2015 | Cox | B64F 1/30 244/137.2 |
| 2015/0076280 A1* | 3/2015 | Cox | B64F 1/305 244/50 |
| 2015/0274324 A1* | 10/2015 | Xiang | B64F 1/305 14/71.5 |
| 2015/0298823 A1* | 10/2015 | Cox | B64F 1/305 14/71.5 |
| 2015/0353207 A1* | 12/2015 | Cox | B64F 1/225 14/71.1 |
| 2016/0052645 A1* | 2/2016 | Kim | B64F 1/305 14/71.1 |
| 2016/0114907 A1* | 4/2016 | Schwartz | G07C 5/0808 701/33.2 |
| 2016/0318629 A1* | 11/2016 | Scharf | B64F 1/315 |
| 2017/0330345 A1* | 11/2017 | Nornes | B63B 27/14 |
| 2018/0141681 A1* | 5/2018 | Schuster | B64F 1/305 |
| 2018/0354650 A1* | 12/2018 | Tan | E01D 15/005 |
| 2018/0371712 A1* | 12/2018 | Glatfelter | E01D 15/005 |
| 2019/0009927 A1* | 1/2019 | Obinna | B64F 1/3055 |
| 2019/0322386 A1* | 10/2019 | Bittroff | B64F 1/305 |

FOREIGN PATENT DOCUMENTS

| | | |
|---|---|---|
| CN | 101109640 A | 1/2008 |
| CN | 102243704 A | 11/2011 |
| CN | 102270039 A | 12/2011 |
| CN | 103164723 A | 6/2013 |
| DE | 10 2011 101418 | 11/2012 |
| KR | 20160001843 A | 1/2016 |
| WO | WO2004/074098 | 9/2004 |
| WO | 2014027946 A1 | 2/2014 |
| WO | WO 2016/099285 | 6/2016 |
| WO | WO 2017/137241 | 8/2017 |
| WO | WO 2017/198605 | 11/2017 |

OTHER PUBLICATIONS

Sick Sensor Intelligence, "Passenger boarding bridge and aircraft docking system", http://www.sick.com/gb/en/industires/airport/aircraft-handling-at-the-terminal/passenger-boarding-bridge-and-aircraft-docking-system/c/g357295, Feb. 1, 2015, 2 pages.

Wikipedia, "Jet Bridge", https://en.wikipedia.org/wiki/Jet_bridge, Jul. 30, 2016, 7 pages.

Agam G., et al., "A Sampling framework for Accurate Curvature Estimation in Discrete Surfaces", IEEE Transactions on Visualization and Computer Graphics, Jul. 25, 2005, pp. 573-583.

Ruilian Z., "Scale-space Technique Based on L-Curvature," I138-929, China Master's theses full-text database-Information Technology collection, Apr. 15, 2013, 97 pages.

* cited by examiner

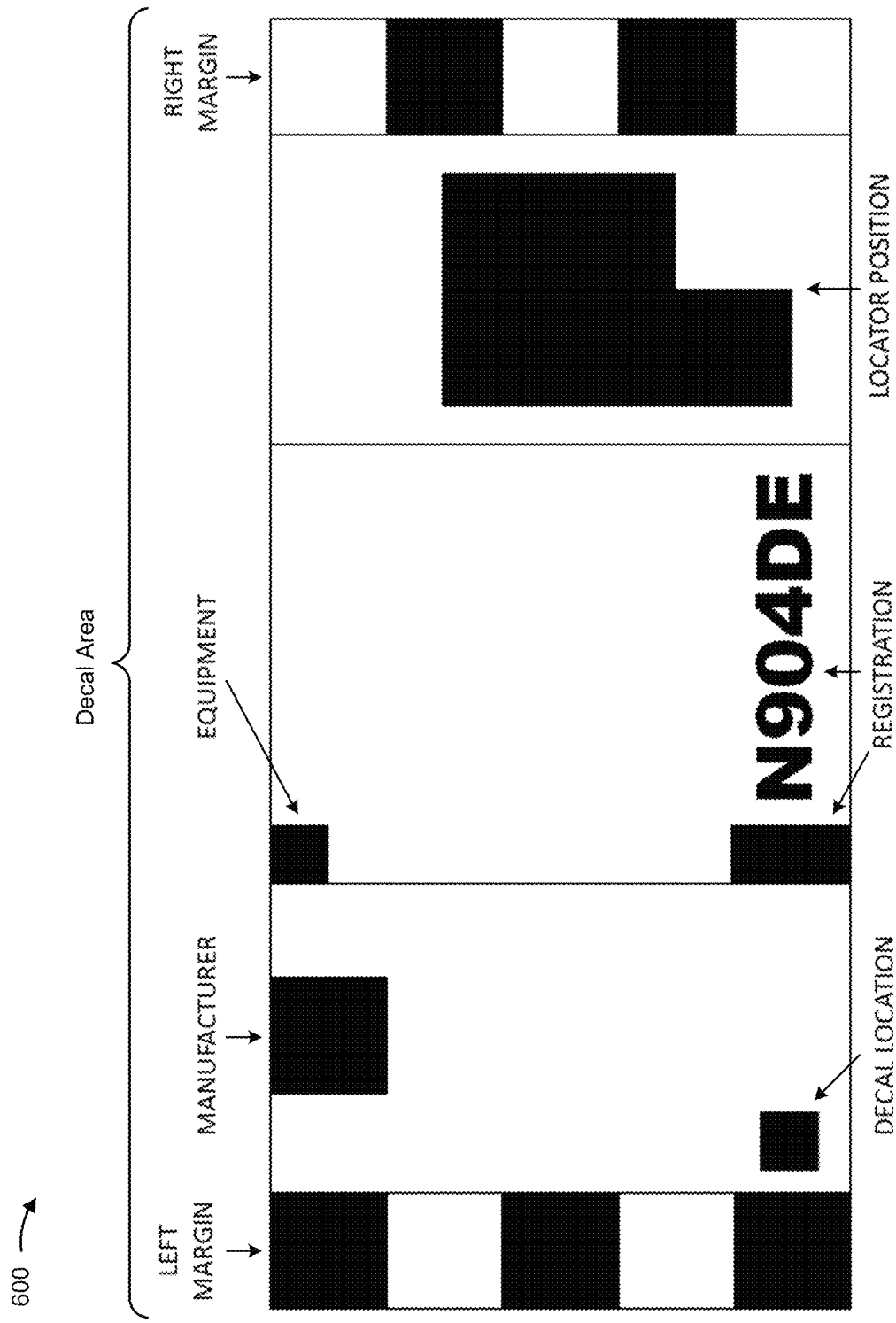

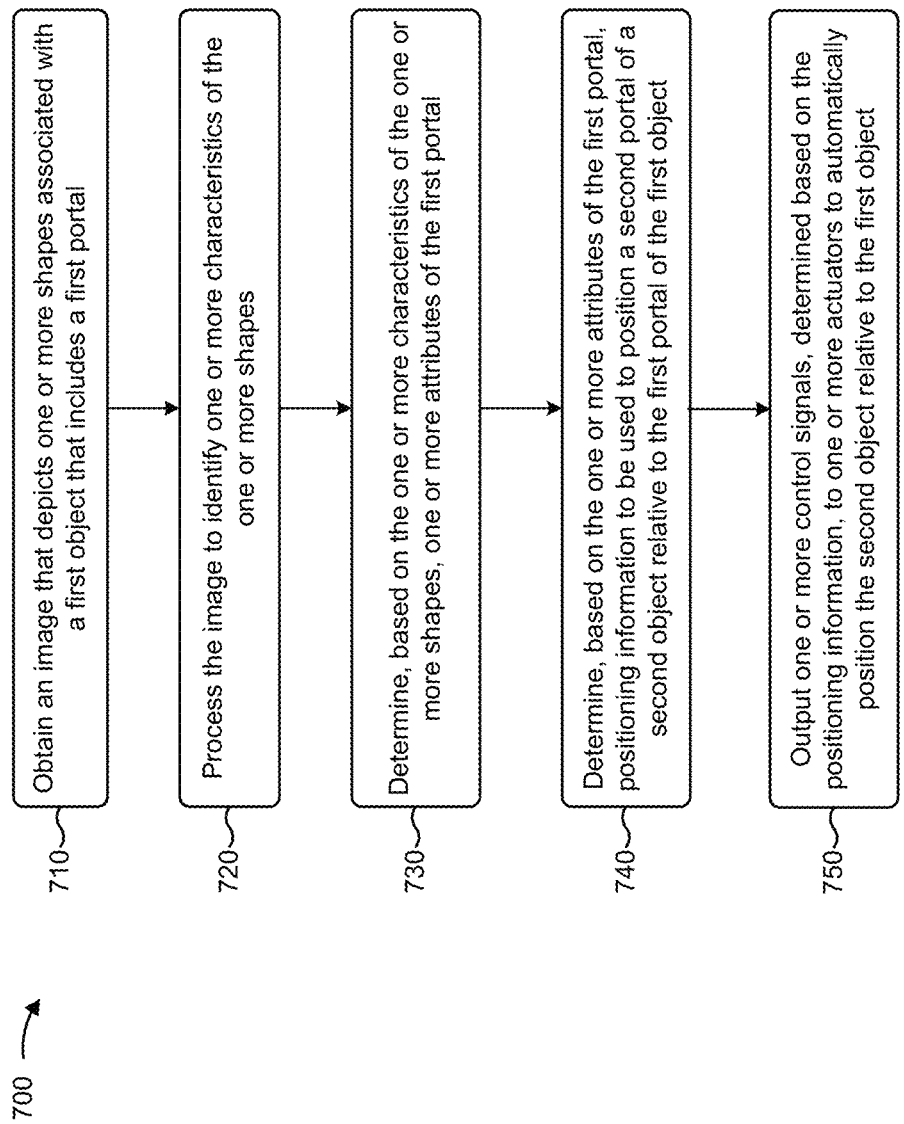

US 10,908,580 B2

DEVICES, SYSTEMS, AND METHODS FOR AUTOMATED LOADING BRIDGE POSITIONING USING SHAPES ASSOCIATED WITH A VEHICLE

RELATED APPLICATIONS

This application is a continuation-in-part of U.S. patent application Ser. No. 15/686,408, filed on Aug. 25, 2017, which is a continuation of U.S. patent application Ser. No. 15/260,887, filed on Sep. 9, 2016, both of which are hereby expressly incorporated by reference.

BACKGROUND

A loading bridge is a movable connector that extends from a building or vehicle to a door on a vehicle. The loading bridge allows passengers or other objects (e.g., cargo) to be boarded or removed from the vehicle. For example, a jet bridge is an example of a loading bridge used to convey passengers from an airport terminal gate to an aircraft, and a gangway is an example of a loading bridge used to convey passengers from a dockside terminal to a cruise ship. The loading bridge may permit loading and unloading without having to go outdoors and without having to ascend or descend stairs to enter or exit the vehicle.

SUMMARY

According to some possible implementations, a device may obtain an image that depicts a shape associated with a first object that includes a first portal. The device may identify, based on the image, one or more characteristics of the shape. The device may determine, based on the one or more characteristics of the shape, one or more attributes of the first portal. The device may determine, based on the one or more attributes of the first portal, positioning information to be used to position a second portal of a second object relative to the first portal of the first object. The device may determine one or more control signals based on the positioning information, and may provide the one or more control signals to one or more actuators to automatically position the second object relative to the first object.

According to some possible implementations, a method may include receiving, by a device, one or more images that depict one or more shapes associated with a first object that includes a portal. The method may include identifying, by the device and based on the one or more images, one or more characteristics of the one or more shapes. The method may include determining, by the device and based on the one or more characteristics of the one or more shapes, one or more attributes of the portal. The method may include determining, by the device and based on the one or more attributes of the portal, positioning information to be used to position a second object relative to the portal of the first object. The method may include outputting, by the device and based on the positioning information, one or more control signals associated with positioning the second object relative to the portal.

According to some possible implementations, a non-transitory computer-readable medium may store one or more instructions that, when executed by one or more processors, cause the one or more processors to identify one or more characteristics of one or more shapes depicted in one or more images. The one or more shapes may be associated with a first object that includes a first portal. The one or more instructions may cause the one or more processors to determine, based on the one or more characteristics of the one or more shapes, one or more attributes associated with the first portal. The one or more instructions may cause the one or more processors to determine, based on the one or more attributes associated with the first portal, positioning information to be used to position a second portal of a second object relative to the first portal of the first object. The one or more instructions may cause the one or more processors to determine one or more control signals based on the positioning information, and provide the one or more control signals to one or more actuators to automatically position the second portal relative to the first portal.

BRIEF DESCRIPTION OF THE DRAWINGS

FIGS. 6A-6D are diagrams of another example implementation relating to the example process shown in FIG. 4; and FIG. 7 is a flow chart of an example process for automated positioning using one or more shapes associated with an object.

DETAILED DESCRIPTION

The following detailed description of example implementations refers to the accompanying drawings. The same reference numbers in different drawings may identify the same or similar elements.

A loading bridge (e.g., a jet bridge) is a movable object that extends to connect to a vehicle, such as an aircraft (e.g., an airplane), a ship, a boat, or another vehicle, so as to allow passengers or objects to enter or exit the vehicle, such as via a door or other entryway on the vehicle. The loading bridge may provide such passengers or objects with access to or from the vehicle that is safe, secure, and protected from outdoor elements.

Different vehicles may have doors in different locations, at different heights, at different positions, of different dimensions, and/or the like. Furthermore, different vehicles may have bodies of different shapes or curvatures. For these reasons, it may be difficult to consistently position or align a loading bridge with a door of a vehicle, potentially causing damage to the vehicle, causing damage to the loading bridge, and/or introducing delay in loading or unloading the vehicle.

Implementations described herein provide a way to automatically align a loading bridge with a door of a vehicle. A processing device obtains images, captured by a camera, of shapes associated with the vehicle, such as encoded decals on the vehicle, designs on the vehicle, a shape of a target area of the vehicle, a shape of the vehicle itself, and/or the like. The processing device analyzes the images to determine characteristics of the shapes and/or encoded decals and determines positioning information based upon those characteristics. Based on the positioning information, the processing device provides control signals to move the loading bridge and align the loading bridge with the vehicle. In this way, the possibility and/or frequency of alignment errors is reduced, thereby reducing the risk of damage to the loading bridge or to the vehicle, reducing risk of injury to passengers and air carrier employees, and/or reducing delays associated with loading or unloading the vehicle.

Figure 1A:
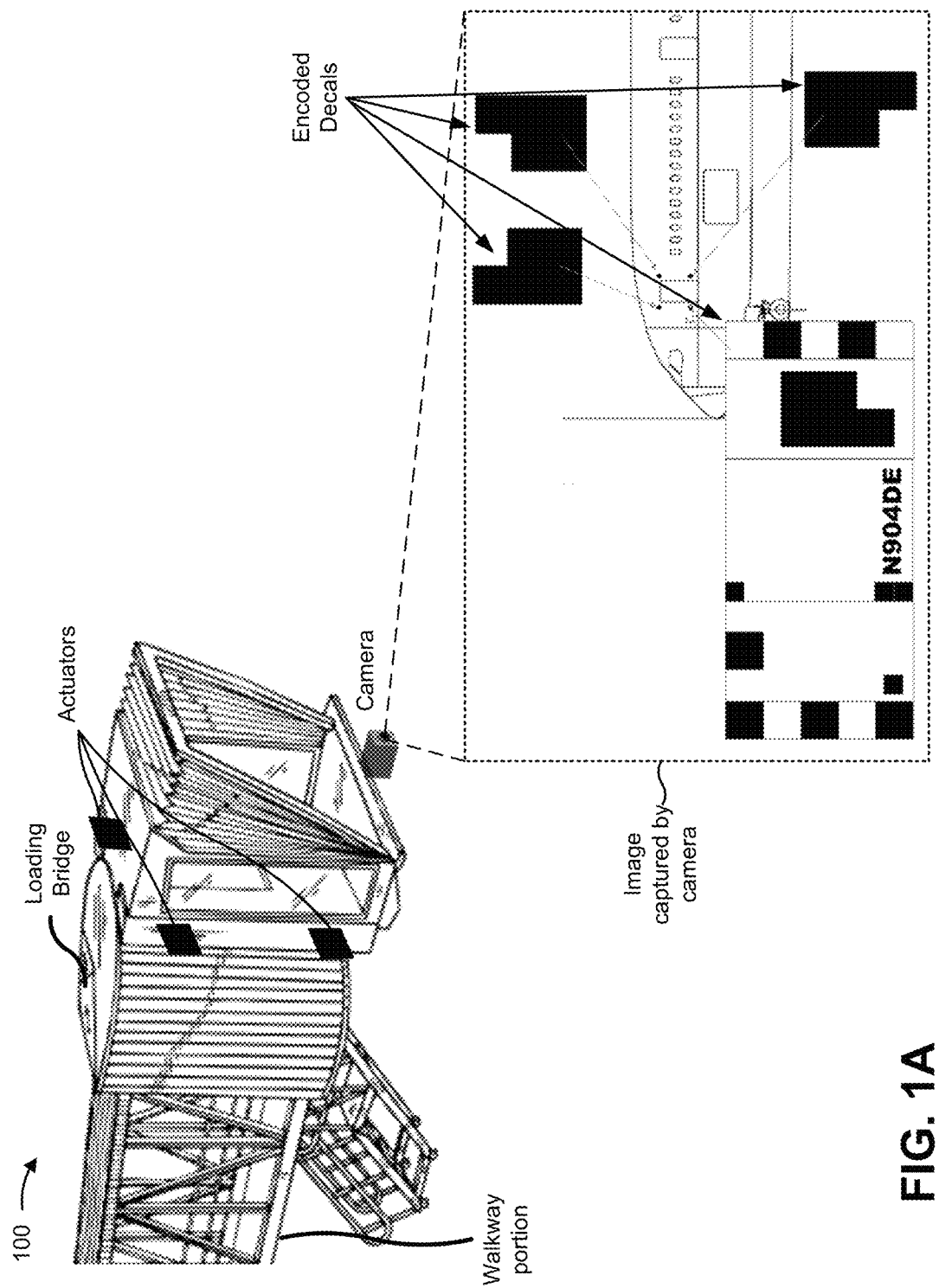
FIGS. 1A and 1B are diagrams of an overview of an example implementation described herein.
Figure 1B:
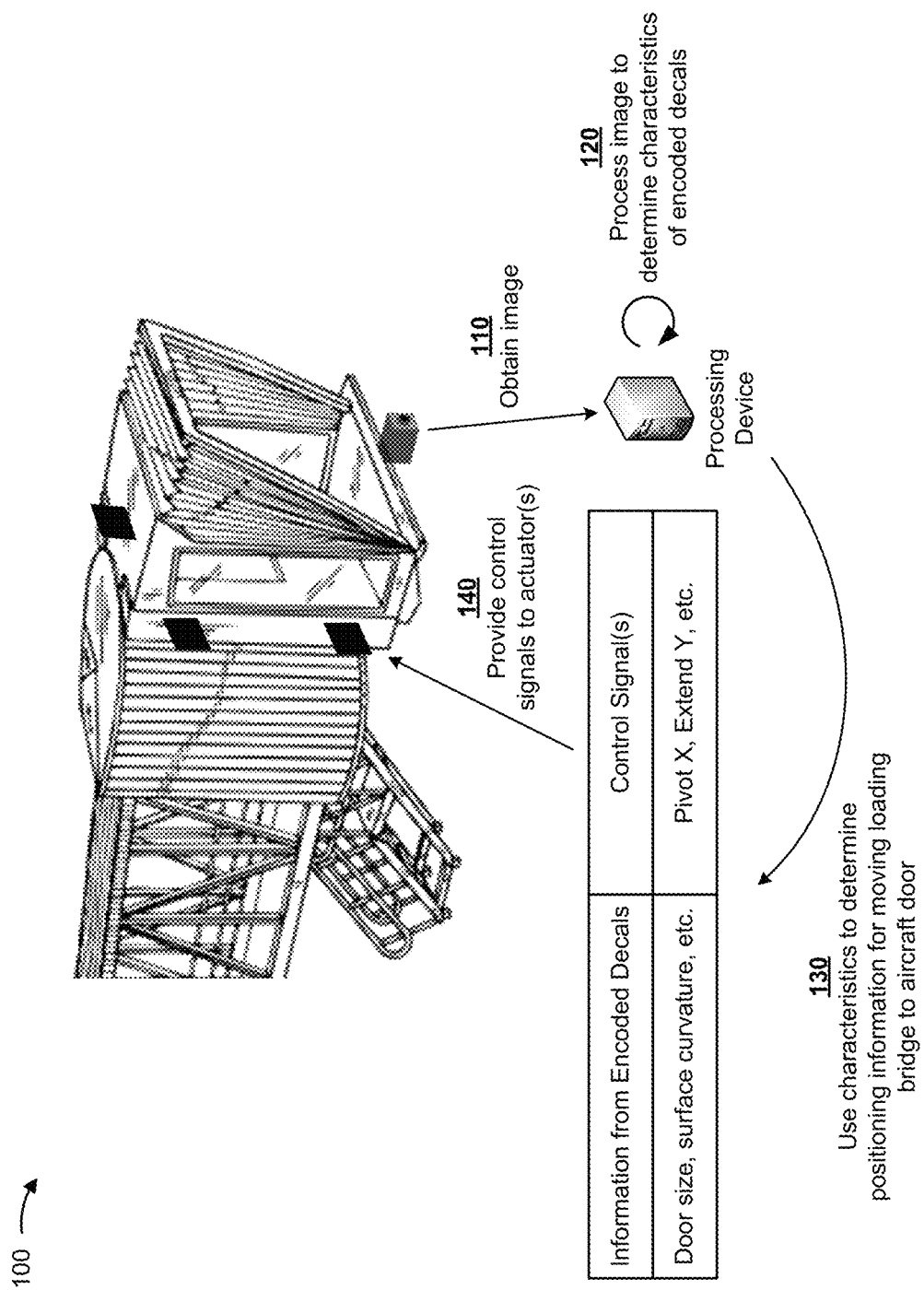

FIGS. 1A and 1B are diagrams of an overview of an example implementation 100 described herein. As shown in FIG. 1A, example implementation 100 may include a loading bridge that includes one or more actuators (e.g., servo controlled motors), for moving the loading bridge, and a camera (or cameras) that may capture an image that includes encoded decals on a vehicle, such as an airplane. Additional actuators (not shown) may also be used to position and/or support a walkway portion associated with the loading bridge. As shown in FIG. 1B, and by reference number 110, a processing device may obtain a series of images from the camera that depicts one or more encoded decals positioned on a surface. For example, the processing device may obtain an image such as the image shown in FIG. 1A, which depicts encoded decals positioned at (e.g., affixed to, painted on, drawn on, and/or the like) the corners of a door on an aircraft.

As shown by reference number 120, the processing device may process the image to determine one or more characteristics (e.g., a shape, a size, a color, a position, etc.) of the one or more encoded decals. As shown by reference number 130, the processing device may use the characteristics to determine positioning information for moving the loading bridge to the aircraft door. For example, the processing device may determine decal information (e.g., door size, surface curvature, etc.) based on the characteristics of the encoded decals, and may determine, based on the decal information, positioning information indicating control signals (e.g., pivot X, extend Y, etc.) to move the loading bridge to the aircraft door. The encoded decals may contain discrete information which can be relied upon by the processing device, or reference information which can be verified by the processing device, as described elsewhere herein.

As shown by reference number 140, the processing device may provide one or more control signals, as indicated by the positioning information, to the actuators in order to automatically position the loading bridge relative to the vehicle. In this way, the possibility and/or frequency of alignment errors is reduced, thereby reducing the risk of damage to the loading bridge or to the vehicle, and/or reducing delays associated with loading or unloading the vehicle.

Although some implementations (e.g., including the implementations described in connection with FIG. 1A and FIG. 1B) are described herein as using encoded decals, other shapes may be used, as described in more detail elsewhere herein. Additionally, or alternatively, although some implementations are described herein as using a camera positioned on the loading bridge, in some implementations, the camera may be positioned on the vehicle, or separate cameras may be positioned on both the loading bridge and the vehicle. Additionally, or alternatively, one or more actuators may be used to move the vehicle. Additionally, or alternatively, the vehicle may include a processing device to provide control signals to one or more actuators of the vehicle.

As indicated above, FIGS. 1A and 1B are provided merely as an example. Other examples are possible and may differ from what was described in connection with FIGS. 1A and 1B.

Figure 2:
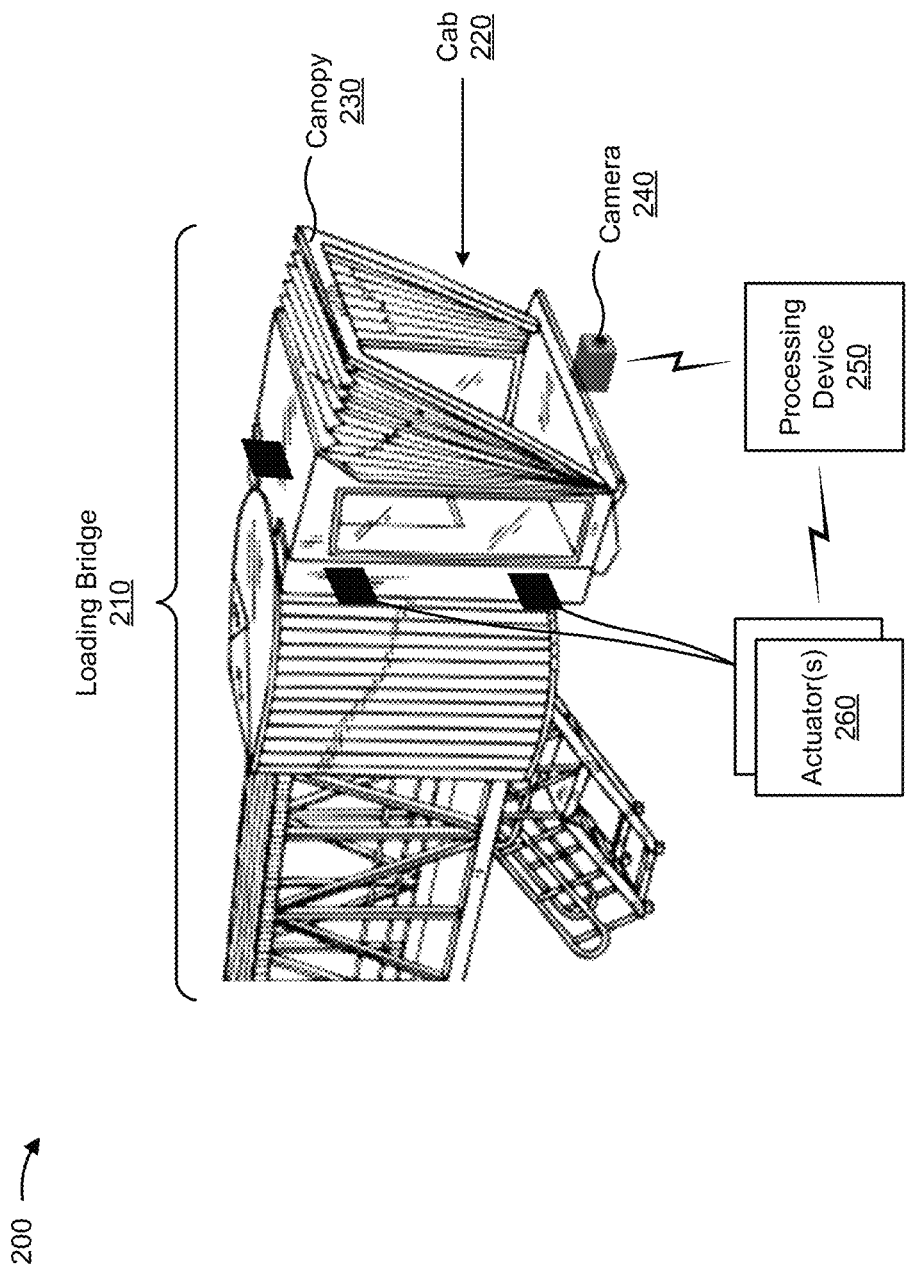
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a loading bridge 210, a cab 220, a canopy 230, a camera 240, a processing device 250, and one or more actuators 260. Devices of environment 200 may interconnect via wired connections, wireless connections, or a combination of wired and wireless connections.

Loading bridge 210 includes one or more devices capable of connecting to a vehicle. For example, loading bridge 210 may include a movable object that connects to an airplane, a boat, a truck, or another type of vehicle. In some implementations, loading bridge 210 may provide for loading or unloading of passengers (e.g., humans, animals, etc.) or objects (e.g., luggage, cargo, smaller vehicles, etc.). While some implementations may be described herein in the context of a loading bridge that connects to a surface of a vehicle, some implementations may apply to other types of movable objects (e.g., another vehicle), which may be designed to connect to any surface.

Cab 220 includes a portion of loading bridge 210, such as a portion at the end of loading bridge 210 that connects to a vehicle. For example, cab 220 may be provided at the end of loading bridge 210 and may be raised or lowered, may be extended or retracted, and/or may pivot, to accommodate vehicles of different heights, sizes, and/or the like. Cab 220 may include an operator's station from which an operator may control the motion of cab 220.

Canopy 230 includes a portion of loading bridge 210 that may extend to the vehicle. For example, canopy 230 may include an accordion-like canopy that allows the bridge to dock with vehicles of differing shapes and sizes, and may provide a nearly weather-proof seal.

Camera 240 includes one or more devices capable of capturing images, such as one or more still images or a sequence of images that form a video. For example, camera 240 may include a still camera (e.g., a digital camera), a video camera (e.g., a digital video camera), and/or the like. In some implementations, camera 240 may be movable and/or may include a movable lens, and camera 240 and/or the lens may move (e.g., orient, zoom, or focus) automatically based on internal functionality (e.g., for identification, tracking, etc.) and/or instructions from another device (e.g., processing device 250). Camera 240 can be configured for day or night operations using, for example, infrared image capture components. Camera 240 may also include distance and/or motion sensing components, such as laser range finders, radar range finders, ultrasonic range finders, passive infrared motion detectors, or another type of sensing component. In some implementations, camera 240 may include a remote sensing component, such as a sensing component that communicates with processing device 250 using a wireless connection, a sensing component associated with an autonomous vehicle, a sensing component of a surface (e.g., an airplane), and/or the like. In some implementations, camera 240 may include multiple cameras, which may communicate directly with processing device 250 or indirectly with processing device 250 (e.g., via an imaging aggregator).

In some implementations, camera 240 may be incorporated into processing device 250 (e.g., via built-in hardware). In some implementations, camera 240 may be separate from processing device 250, and may communicate with processing device 250 to provide images and/or other information to processing device 250 and/or to obtain instructions and/or other information from processing device 250. In this case, camera 240 may communicate with processing device 250 via a wired connection (e.g., a universal serial bus (USB) connection, an Ethernet connection, etc.) and/or a wireless connection (e.g., a Wi-Fi connection, a near field communication (NFC) connection, etc.).

Processing device 250 includes one or more devices capable of processing images. For example, processing device 250 may include a computing device, such as a desktop computer, a laptop computer, a server, and/or the like. In some implementations, processing device 250 may process one or more images captured by camera 240. Based on processing the images, processing device 250 may provide one or more control signals to one or more actuators 260 to position loading bridge 210 (e.g., cab 220 of loading bridge 210) relative to a vehicle. In some implementations, processing device 250 may provide information to camera 240 indicating adjustments to orientation, zoom, focus, and/or the like, to capture additional images, to improve clarity of images, and/or the like.

Actuator 260 includes one or more devices capable of moving or controlling loading bridge 210. For example, actuator 260 may include a hydraulic actuator, a pneumatic actuator, an electric actuator, a servomechanism, and/or the like. In some implementations, actuator 260 may receive one or more control signals from processing device 250, and may perform a mechanical action based on the control signal(s). For example, actuator 260 may perform a mechanical action to raise, lower, extend, retract, or pivot loading bridge 210.

Although FIG. 2 depicts camera 240, processing device 250, and actuator(s) 260 as being incorporated into loading bridge 210, in some implementations, camera 240, processing device 250, and/or actuator(s) 260 may be incorporated into a vehicle. For example, the vehicle may include camera 240, processing device 250, and/or actuator(s) 260, and may analyze one or more shapes associated with loading bridge 210 to move the vehicle relative to loading bridge 210. Additionally, or alternatively, both loading bridge 210 and the vehicle may include camera 240, processing device 250, and/or actuator(s) 260, which may permit either or both of the objects to move based on detecting shapes positioned on the other object. Implementations described herein may permit any two objects (e.g., a loading bridge and a vehicle, two vehicles, two loading bridges, and/or the like), either or both of which may include camera 240, processing device 250, and/or actuator(s) 260, to move based on detecting shapes associated with the other object.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
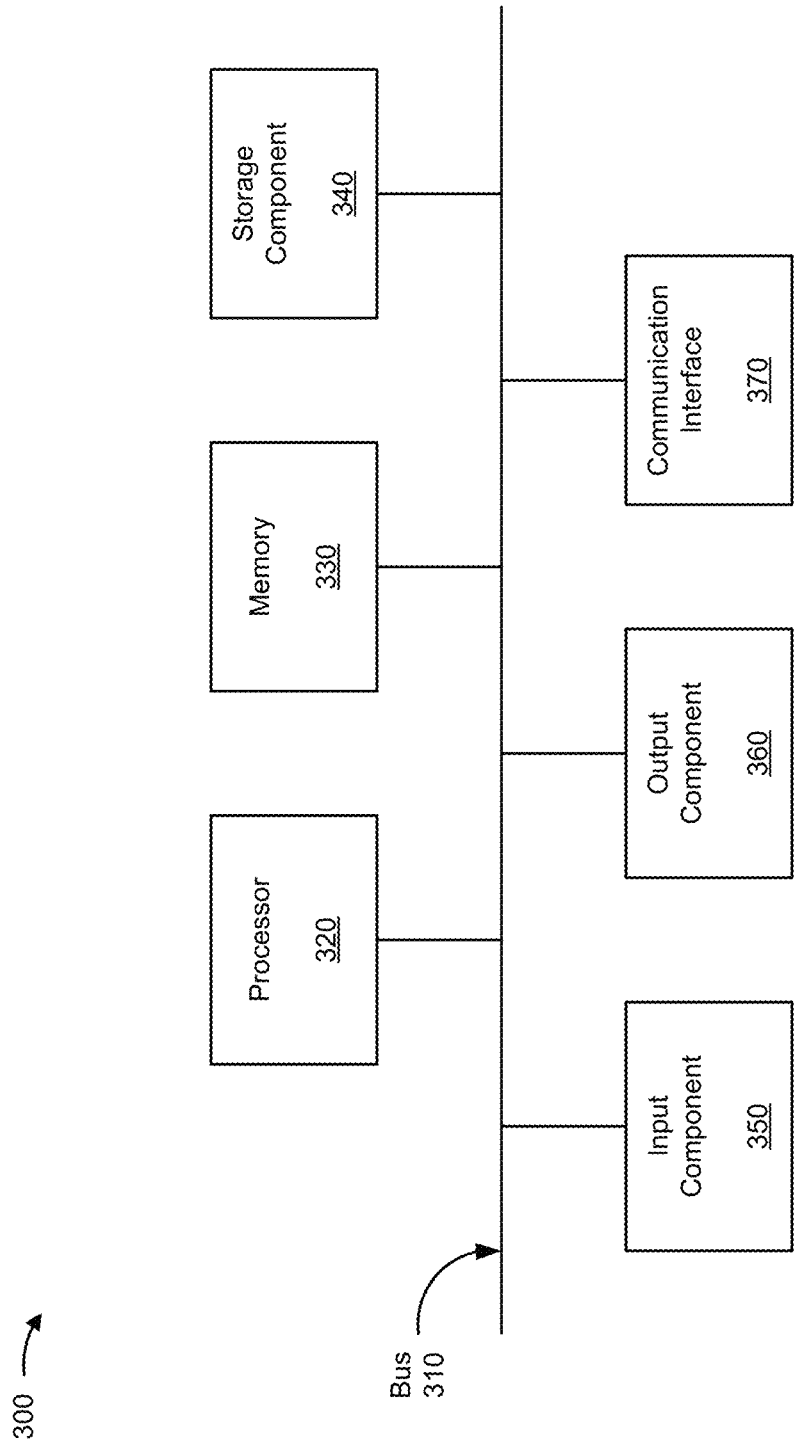
FIG. 3 is a diagram of example components of one or more devices of FIG. 2.

FIG. 3 is a diagram of example components of a device 300. Device 300 may correspond to camera 240, processing device 250, and/or actuator 260. In some implementations, camera 240, processing device 250, and/or actuator 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
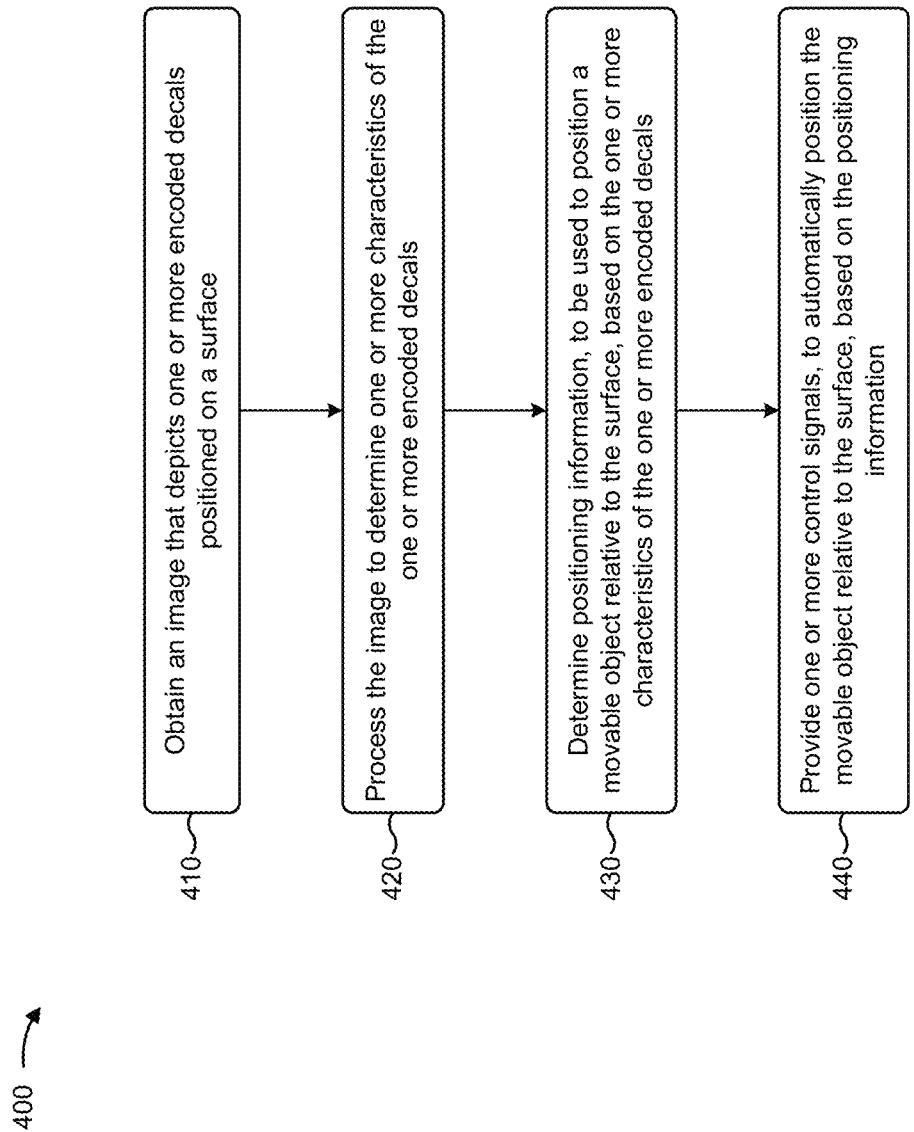
FIG. 4 is a flow chart of an example process for automated positioning using encoded decals.

FIG. 4 is a flow chart of an example process 400 for automated positioning using encoded decals. In some implementations, one or more process blocks of FIG. 4 may be performed by processing device 250. In some implementations, one or more process blocks of FIG. 4 may be performed by another device or a group of devices separate from or including processing device 250, such as camera 240 and/or actuator 260.

As shown in FIG. 4, process 400 may include obtaining an image that depicts one or more encoded decals positioned on a surface (block 410). For example, processing device 250 may obtain, from camera 240, an image that depicts one or more encoded decals positioned on a surface. In some implementations, the surface may be a body of a vehicle, and the encoded decals may be affixed to the body of the vehicle (e.g., by sticking the encoded decals to the body of the vehicle, by painting or drawing the encoded decals on the body of the vehicle, and/or the like).

In some implementations, the encoded decals may be positioned or affixed to the surface relative to a target area of the surface. For example, the encoded decals may be positioned on the target area, above the target area, below the target area, to the left of the target area, to the right of the target area, at multiple locations near or around the target area (e.g., on each side of the target area, in the corners of the target area, etc.), and/or the like. In some implementations, the target area may include a portal (e.g., a hole, door, point of entry, point of exit, and/or the like, for a vessel, such as a vehicle, a loading bridge, and/or the like). For example, the target area may include a door, an opening, a location where passengers or cargo enter or exit a vehicle, a location where material is to be deposited or removed, and/or the like. In some implementations, the portal may be enclosed by a frame (e.g. a door). In some implementations, the portal may not be enclosed by a frame (e.g. a ledge). In some implementations, the target area may be a target for automatically moving a movable object (e.g., loading bridge 210) relative to the surface, as described below.

Any number of encoded decals may be positioned on the surface and/or depicted in the image. For example, the encoded decals may include a single encoded decal (e.g., positioned in the center of the target area). As another example, the encoded decals may include two encoded decals (e.g., positioned on opposite sides of the target area). As other examples, the encoded decals may include three encoded decals, four encoded decals (e.g., positioned on all sides of the target area, positioned at the corners of the target area, etc.), or more encoded decals. As a particular example, FIGS. 5A and 5B each show four encoded decals positioned at the corners of a door on an aircraft.

In some implementations, processing device 250 may periodically receive still images and/or may receive a video stream of a sequence of images (e.g., from camera 240). In this case, processing device 250 may process an image to determine whether encoded decals are depicted in the image. If encoded decals are not depicted, processing device 250 may discard the image to conserve processing resources and memory resources. If encoded decals are depicted, processing device 250 may process the image to determine positioning information, as described below. In the event that no encoded decals are depicted, processing device 250 may command the camera (or cameras) 240 to search a larger area to discover encoded decals (e.g., by zooming out).

In some implementations, one or more of the encoded decals may indicate an encoded area, on the surface, where the encoded decals are located. For example, an encoded decal may indicate a margin or border of an encoded area. As a particular example, as shown in FIGS. 6A-6D, an encoded area may be bounded by a shape pattern indicating a left margin and a shape pattern indicating a right margin. In this case, processing device 250 may interpret the information between the left margin and the right margin as including one or more patterns or shapes to represent particular types of information based on their position within the encoded area. For example, based on identifying the left and right margin, processing device 250 may identify a lower central portion, of an area between the left and right margin, as indicating registration information, as shown in FIGS. 6A-6D.

Figure 5A:
FIGS. 5A and 5B are diagrams of an example implementation relating to the example process shown in FIG. 4.
Figure 5B:
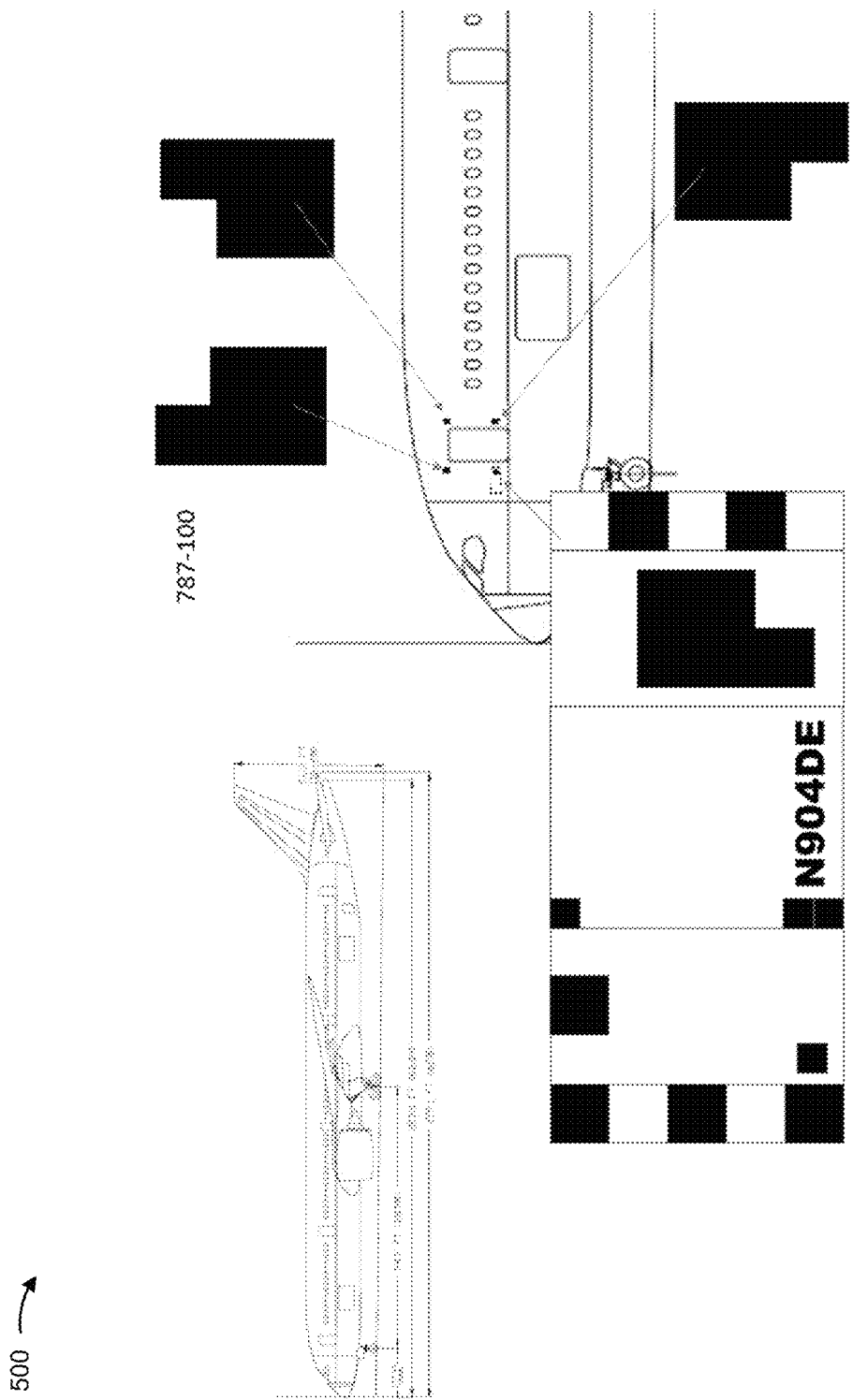

Additionally, or alternatively, an encoded decal may indicate a decal location (e.g., a position of an encoded decal relative to other encoded decals), and/or the like. For example, the encoded decal at each door corner may include a different shape that is unique to the corner in which the encoded decal is located. As a particular example, as shown in FIGS. 5A-5B, the shape may include a larger block and a smaller block, with the location of the smaller block relative to the larger block (e.g., above left, above right, below left, below right) indicating the location of the encoded decal relative to the door. In some implementations, processing device 250 may use the decal location information to determine whether to further process the image (e.g., to determine whether all encoded decals are depicted, or have been depicted).

In some implementations, processing device 250 may receive other sensor information, such as range finding information from a laser range finder, a radar range finder, and/or the like. For example, processing device 250 may receive range finding information indicating a distance between a movable object (e.g., loading bridge 210) and a surface (e.g., an airplane). In this case, processing device 250 may utilize the range finding information to provide one or more control signals to automatically position the movable object. Additionally, or alternatively, processing device 250 may use the range finding information to provide a control signal to camera 240 to alter a zoom of camera 240 (e.g., to zoom in or to zoom out), an orientation of camera 240, and/or the like to cause camera 240 to obtain an image of an encoded decal.

As further shown in FIG. 4, process 400 may include processing the image to determine one or more characteristics of the one or more encoded decals (block 420). For example, processing device 250 may analyze the image to determine one or more characteristic(s) of the encoded decal(s) depicted in the image. A characteristic of the encoded decals may include a shape, an orientation, a color of an encoded decal, and/or the like. As another example, a characteristic of the encoded decals may include a size of an encoded decal (e.g., relative to sizes of one or more other encoded decals). As yet another example, a characteristic of the encoded decals may include a position of an encoded decal relative to one or more other encoded decals, or relative to one or more surface features of the surface. As still another example, a characteristic of the encoded decals may include a quantity of the encoded decals. As another example, a characteristic of the encoded decals may include a pattern formed by multiple encoded decals (e.g., based on position, shape, orientation, color, size, etc.). As another example, an encoded decal may include human readable characters or other symbols which can be decoded by processing device 250.

Although characteristics are described with reference to particular attributes above, in some implementations, processing device 250 may analyze the image to determine characteristics corresponding to other attributes of the encoded decals, and/or may determine characteristics corresponding to any number and combination of attributes. Additionally, or alternatively, processing device 250 may analyze the image to determine one or more characteristics of the surface. For example, processing device 250 may determine an outline of a door based on different colors, contrast, shadows, and/or the like.

As shown in FIG. 4, process 400 may include determining positioning information, to be used to position a movable object relative to the surface, based on the one or more characteristics of the one or more encoded decals (block 430). For example, processing device 250 may determine positioning information based on the one or more characteristics of the one or more encoded decals depicted in an image. In some implementations, positioning information may be used by processing device 250 to determine one or more control signals to be provided to one or more actuators 260 to control a position of a movable object (e.g., loading bridge 210) relative to a surface (e.g., a body of an airplane or another vehicle). For example, positioning information may indicate which actuators 260 are to be provided with control signals, a strength of a control signal, a sequence in which control signals are to be provided (e.g., a sequence for a single actuator 260, or a sequence for multiple actuators 260), a duration of time during which a control signal is to be provided, a type of control signal (e.g., to cause the movable object to be extended, retracted, raised, lowered, pivoted in a particular direction, etc.), and/or the like.

In some implementations, processing device 250 may determine positioning information based on decal information that is obtained based on processing one or more images. For example, processing device 250 may store decal information in a data structure, and may use the decal information to determine the positioning information (e.g., based on a correspondence in the data structure). The decal information may include information regarding an encoded decal, a surface, and/or a vehicle. For example, the decal information may include information regarding a vehicle to which the encoded decals are affixed.

In some implementations, the decal information may indicate a size or dimensions of the target area (e.g., a size of a door, or dimensions of a door), a size of one or more encoded decals, a curvature of the surface (e.g., a curvature of an airplane body), a manufacturer and/or model of the vehicle, a location of the target area on the vehicle (e.g., a forward door on an aircraft, a rear door of an aircraft, a cargo door of an aircraft, etc.), a location of an encoded decal relative to the target area and/or relative to other encoded decals, vehicle identification information associated with a particular vehicle (e.g., a vehicle identifier, such as a vehicle registration number, a vehicle serial number, a vehicle identification number, etc.), and/or the like.

Figure 6B:
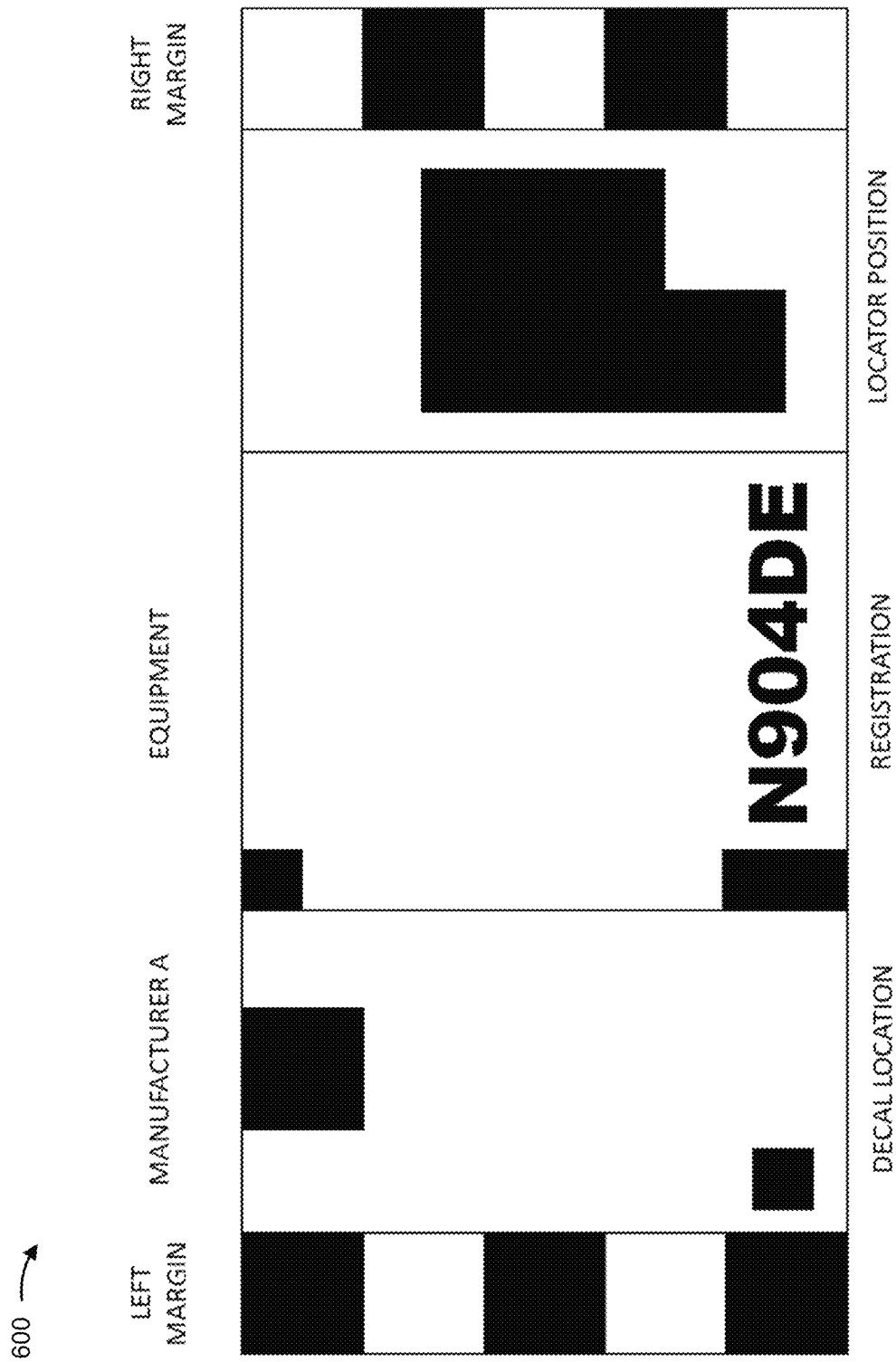
Figure 6C:
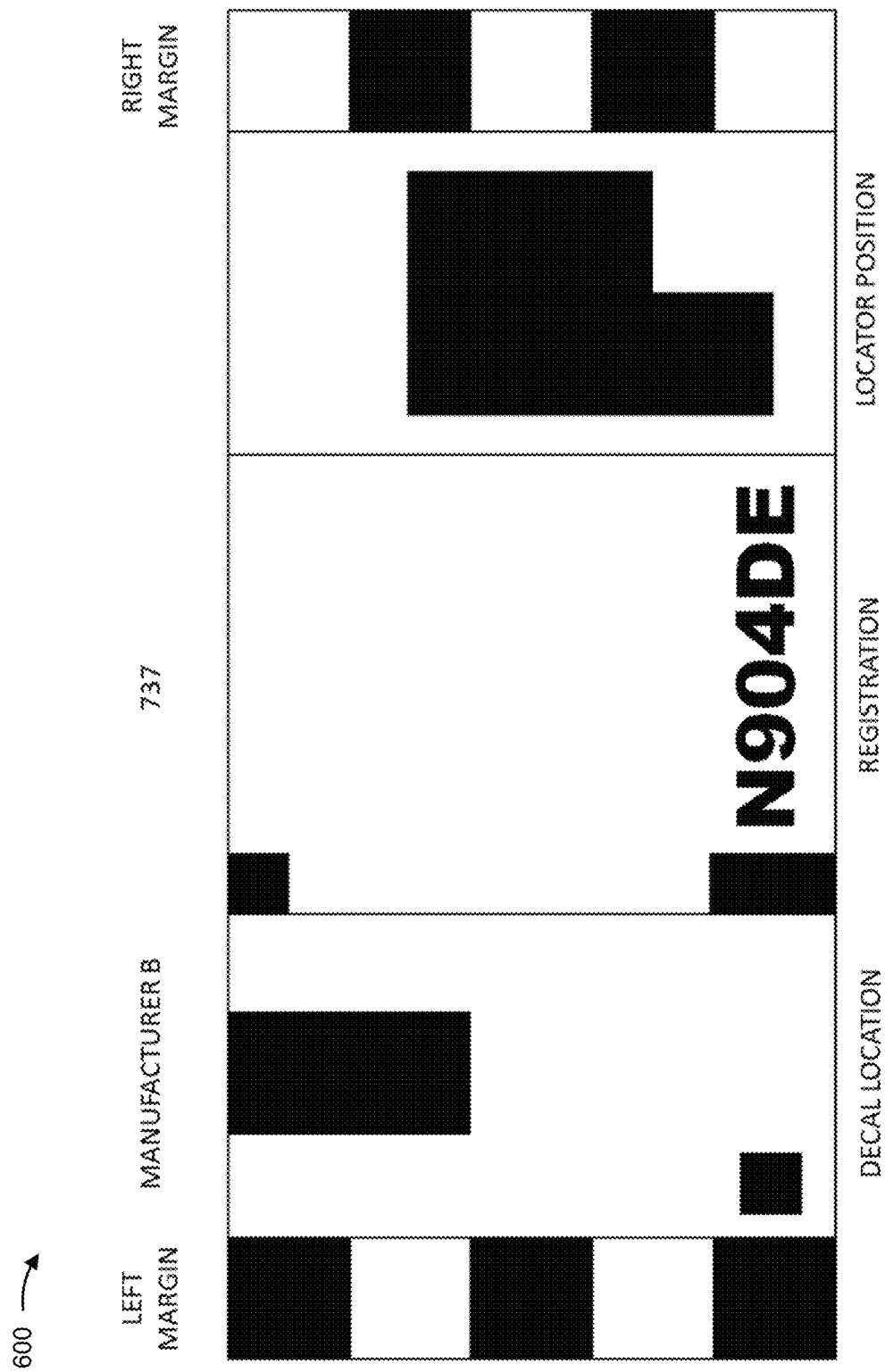
Figure 6D:
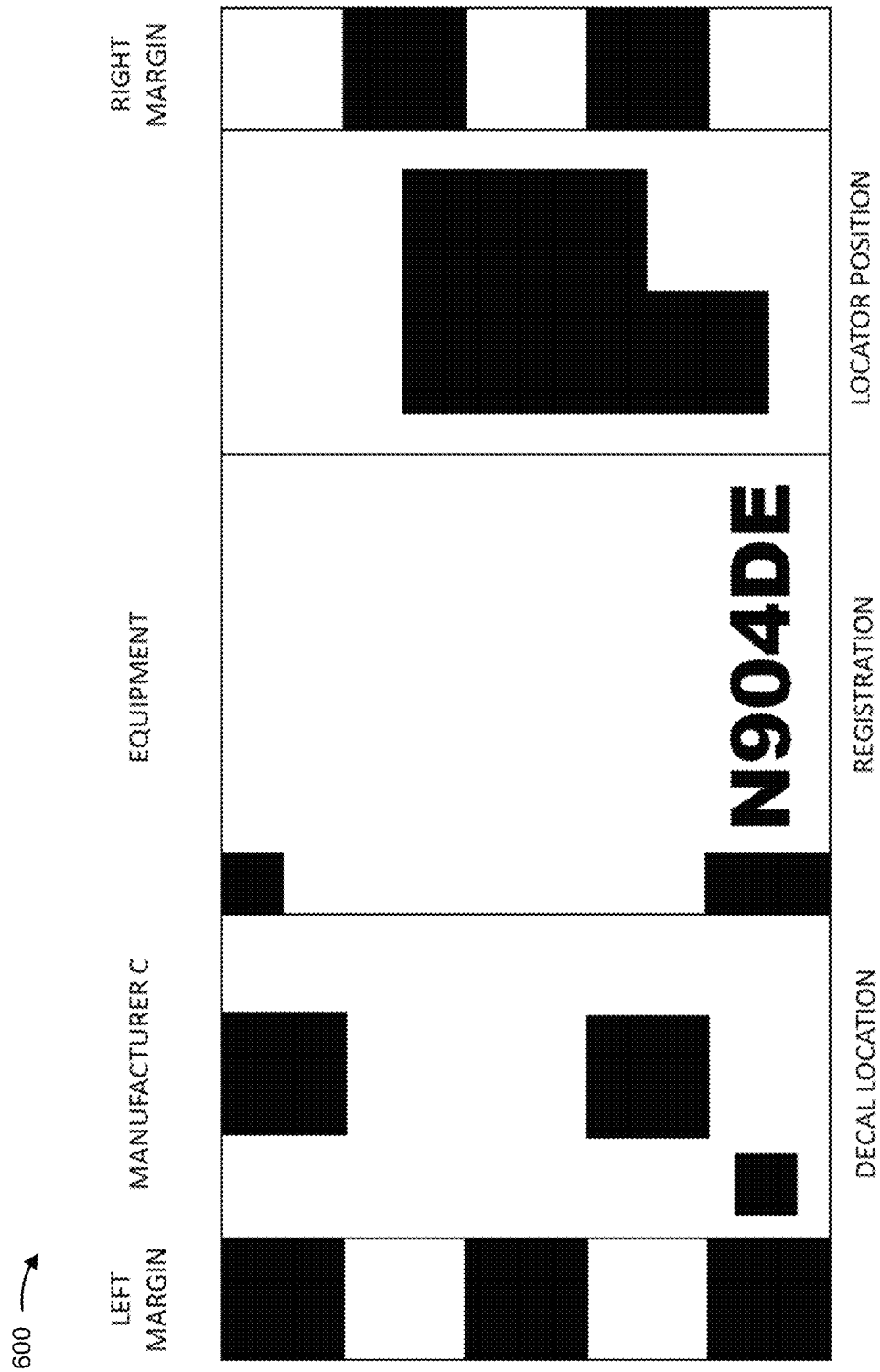

As an example, FIGS. 6A-6D show examples of encoded decals that may correspond to decal information, such as the decal information described above. In FIG. 6A, one or more encoded decals, located within the encoded area (e.g., bounded by the left margin and the right margin), may indicate a manufacturer, a type of equipment (e.g., a type of vehicle, a vehicle model, etc.), a location of the encoded decal relative to a target area (e.g., shown as "Decal Location"), registration information associated with the vehicle, and/or a location of the target area on the vehicle (e.g., shown as "Locator Position"). FIGS. 6B-6D show additional examples of using different sizes, shapes, and/or positions of encoded decals to indicate different manufacturers.

In some implementations, processing device 250 may store one or more data structures that associate encoded decal characteristics and decal information, and that associate decal information and positioning information. In this way, processing device 250 may enhance a user experience by making updates to the data structures more user-friendly via input of decal information. In some implementations, processing device 250 may store a data structure that directly associates encoded decal characteristics and positioning information. This may reduce processing time and conserve processing resources by eliminating data structure operations associated with using decal information.

As further shown in FIG. 4, process 400 may include providing one or more control signals, to automatically position the movable object relative to the surface, based on the positioning information (block 440). For example, processing device 250 may provide one or more control signals to one or more actuators 260 in a manner specified by the positioning information. As a particular example, processing device 250 may provide control signals to particular actuators 260, and/or may provide the control signals in a particular sequence, with a particular signal strength, for a particular duration of time, and/or the like. In this case, actuator 260 may move loading bridge 210 based on the control signals to automatically position loading bridge 210 relative to a body of a vehicle.

During positioning of the movable object, processing device 250 may obtain additional images (e.g., still images or video) from camera 240, may analyze the additional images, and may provide further control signals based on analyzing the images. For example, processing device 250 may determine a distance of loading bridge 210 from a target area based on a known size of an encoded decal and a size of the encoded decal observed in an image. In this case, processing device 250 may provide the control signal based on the determined distance, which may be different for different types of vehicles (e.g., the aircraft shown in FIGS. 5A and 5B). As another example, processing device 250 may determine a position relative to a target area based on a known pattern of encoded decals and a pattern of encoded decals observed in an image. In this case, processing device 250 may provide a control signal based on the determined position.

In some implementations, prior to providing control signals for automatic positioning, processing device 250 may perform a verification of the vehicle. For example, processing device 250 may compare vehicle registration information and other decal information to confirm accuracy of decal information. If there is a mismatch, or if verification otherwise fails (e.g., vehicle registration information indicates a first type of vehicle, and encoded decal characteristics indicate a second type of vehicle), then processing device 250 may prevent automatic positioning from being performed. In this case, processing device 250 may prevent control signals from being provided to actuators 260, and/or may provide an alert (e.g., via an output device, such as a display or a speaker) indicating that manual positioning of loading bridge 210 is required.

In some implementations, processing device 250 may perform verification using a database of vehicle information.

In this case, processing device 250 may verify whether an identified vehicle (e.g., identified using encoded decals) is a correct vehicle for a gate, a dock, and/or the like. For example, the database may indicate vehicle types permitted to be connected to a particular loading bridge.

In some implementations, processing device 250 may determine whether positioning of the movable object relative to the surface is complete. For example, processing device 250 may determine whether positioning of the movable object is complete based on a distance, a position, a size of one or more encoded decals, one or more sensor readings, and/or the like. In some implementations, processing device 250 may output a control signal to perform an action based on determining that positioning of the movable object is complete. For example, processing device 250 may output a control signal to open a door, to start a conveyor, to provide a notification, and/or the like. Additionally, or alternatively, processing device 250 may output a signal (e.g., an audible signal, a visible signal, etc.) to notify a user (e.g., an operator) that positioning of the movable object is complete.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 7 is a flow chart of an example process 700 for automated positioning using one or more shapes associated with an object. In some implementations, one or more process blocks of FIG. 7 may be performed by processing device 250. In some implementations, one or more process blocks of FIG. 7 may be performed by another device or a group of devices separate from or including processing device 250, such as camera 240 and/or actuator 260.

As shown in FIG. 7, process 700 may include obtaining an image that depicts one or more shapes associated with a first object that includes a first portal (block 710). For example, processing device 250 may obtain, from camera 240, one or more images that depict one or more shapes, in a similar manner as described above in connection with block 410 of FIG. 4. The one or more shapes may be associated with a first object (e.g., a vehicle, a loading bridge, and/or the like), which may include a first target area, such as a first portal (e.g., a point of entry or exit of the first object).

In some implementations, the one or more shapes may be positioned on a surface of the first object. For example, the one or more shapes may include one or more encoded decals, as described elsewhere herein. The one or more encoded decals may be positioned on a surface of the first object (e.g., affixed to the surface, painted on the surface, drawn on the surface, and/or the like). Additionally, or alternatively, the one or more shapes may include a shape of a design positioned on the surface of the first object. For example, the design may be a logo, an emblem, a name, and/or the like of a company associated with the first object (e.g., an airline, a cruise line, and/or the like). In some implementations, the design may include one or more characters (e.g., letters, numbers, and/or the like). In some implementations, the design may be positioned relative to the first portal, in a similar manner as described above in connection with block 410 of FIG. 4. Additionally, or alternatively, the one or more shapes may include one or more surface features of the first object (e.g., a wing of an aircraft or other vehicle, a nose of an aircraft or other vehicle, a tail of an aircraft or other vehicle, a window, a screw, a bolt, and/or the like).

Additionally, or alternatively, the one or more shapes may include a shape of the first portal (e.g., a shape of a door, an opening, an entry, an exit, and/or the like). Additionally, or alternatively, the one or more shapes may include a shape of the first object (e.g., a shape of a vehicle, a shape of a loading dock, and/or the like).

As further shown in FIG. 7, process 700 may include processing the image to identify one or more characteristics of the one or more shapes (block 720). For example, processing device 250 may analyze one or more images to determine one or more characteristics of the one or more shapes. In some implementations, a characteristic of a shape may include, for example, an outline of the shape (e.g., an outline of a decal, a design, a portal, an object, and/or the like), an orientation of the shape, a color of the shape, and/or the like. Additionally, or alternatively, a characteristic of a shape may include a size of the shape (e.g., relative to a size of one or more other shapes). Additionally, or alternatively, a characteristic of a shape may include a position of the shape relative to one or more other shapes. Additionally, or alternatively, a characteristic of a shape may include a pattern associated with one or more shapes (e.g., a fill pattern of a shape, a pattern formed by multiple shapes, and/or the like) formed by multiple encoded decals (e.g., based on position, shape, orientation, color, size, etc.).

As further shown in FIG. 7, process 700 may include determining, based on the one or more characteristics of the one or more shapes, one or more attributes of the first portal (block 730). For example, the one or more characteristics of the one or more shapes may indicate one or more attributes of the first portal. In some implementations, processing device 250 may store information (e.g., in a data structure) that associates the one or more shape characteristics with the one or more attributes of the first portal. In some implementations, an attribute of the first portal may indicate a size of the first portal, one or more dimensions of the first portal, a location of the first portal (e.g., on the first object, relative to one or more shapes, and/or the like), a curvature associated with the first portal (e.g., a curvature of a surface that includes the first portal), and/or the like.

As further shown in FIG. 7, process 700 may include determining, based on the one or more attributes of the first portal, positioning information to be used to position a second portal of a second object relative to the first portal of the first object (block 740). For example, processing device 250 may determine positioning information based on the one or more attributes of the first portal, in a similar manner as described above in connection with block 430 of FIG. 4. In some implementations, the positioning information may be used by processing device 250 to determine one or more control signals to be provided to one or more actuators 260 to control a position of a second object (e.g., a second target area or a second portal of the second object) relative to a first object (e.g., a first target area or a first portal of the first object). In some implementations, the first object may be a vehicle, and the second object may be a loading bridge. In some implementations, the first object may be a loading bridge, and the second object may be a vehicle. In some implementations, the first object may be a first vehicle, and the second object may be a second vehicle. In some implementations, the first object may be a first loading bridge, and the second object may be a second loading bridge.

As further shown in FIG. 7, process 700 may include outputting one or more control signals, determined based on the positioning information, to one or more actuators to automatically position the second object relative to the first object (block 750). For example, processing device 250 may provide one or more control signals to one or more actuators 260 in a manner specified by the positioning information, in a similar manner as described above in connection with block 440 of FIG. 4. In this way, a first object and/or a first portal of the first object may be automatically aligned with a second object and/or a second portal of the second object, thereby reducing the possibility and/or frequency of alignment errors, reducing the risk of damage to the objects and/or portals, and/or reducing delays associated with loading or unloading the objects.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Implementations described herein provide a loading bridge with a camera and a processing device that automatically aligns the loading bridge with a door of a vehicle based on one or more images captured by the camera. In this way, the possibility and/or frequency of alignment errors is reduced, thereby reducing the risk of damage to the loading bridge or to the vehicle, and/or reducing delays associated with loading or unloading the vehicle.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
   obtain an image that depicts one or more shapes associated with a first object that includes a first portal,
     the one or more shapes including a shape of a design on a surface of the first object,
       the design including at least one of:
         a logo, or
         a name, and
     the one or more shapes including one or more encoded decals;
   identify, based on the image, one or more characteristics associated with at least one of the logo or the name;
   obtain, from a data structure and based on the one or more characteristics associated with at least one of the logo or the name, one or more attributes of the first portal,
     wherein the data structure associates the one or more characteristics with the one or more attributes of the first portal;
   determine, based on the one or more attributes of the first portal, positioning information to be used to position a second portal of a second object relative to the first portal of the first object,
     the positioning information indicating one or more control signals for moving the second object in a particular way;
   determine the one or more control signals based on the positioning information; and
   provide the one or more control signals to one or more actuators to automatically position the second object relative to the first object.

2. The device of claim 1, where the one or more shapes are positioned on the surface of the first object.

3. The device of claim 1, where the one or more actuators include one or more of:
   a hydraulic actuator,
   a pneumatic actuator,
   an electric actuator, or
   a servomechanism.

4. The device of claim 1, where the design is painted on the surface of the first object.

5. The device of claim 1, wherein the one or more processors, prior to providing the one or more control signals to the one or more actuators to automatically position the second object relative to the first object, are to:
   perform a verification of the first object.

6. The device of claim 1, where the one or more shapes include a shape of the first portal.

7. The device of claim 1, where the one or more shapes include a shape of the first object.

8. The device of claim 1, where the first object is a vehicle and the second object is a loading bridge to be positioned relative to the vehicle.

9. The device of claim 1, where the first object is a loading bridge and the second object is a vehicle to be positioned relative to the loading bridge.

10. The device of claim 1,
    where the one or more characteristics of the one or more shapes include at least one of:
    an outline of a shape of the one or more shapes,
    an orientation of a shape of the one or more shapes, a position of a first shape, of the one or more shapes, relative to a second shape of the one or more shapes,
a color of a shape of the one or more shapes,
a size of a shape of the one or more shapes, or
a pattern formed by the one or more shapes; and
where the one or more processors, when obtaining the one or more attributes of the first portal, are to:
obtain, based on the one or more characteristics of the one or more shapes, the one or more attributes of the first portal.

11. The device of claim 1, where the one or more attributes of the first portal include at least one of:
a size of the first portal,
one or more dimensions of the first portal,
a location of the first portal, or
a curvature associated with the first portal.

12. A method, comprising:
receiving, by a device, one or more images that depict one or more shapes associated with a first object that includes a portal,
the one or more shapes including a shape of a design on a surface of the first object,
the design including at least one of:
a logo, or
a name, and
the one or more shapes including one or more encoded decals;
identifying, by the device and based on the one or more images, one or more characteristics associated with at least one of the logo or the name;
obtaining, by the device, from a data structure, and based on the one or more characteristics associated with at least one of the logo or the name, one or more attributes of the portal,
wherein the data structure associates the one or more characteristics with the one or more attributes of the portal;
determining, by the device and based on the one or more attributes of the portal, positioning information to be used to position a second object relative to the portal of the first object,
the positioning information indicating one or more control signals for moving the second object in a particular way; and
outputting, by the device and based on the positioning information, the one or more control signals associated with positioning the second object relative to the portal.

13. The method of claim 12, where the one or more shapes further include at least one of:
a shape on a surface of the first object,
a shape of the portal, or
a shape of the first object.

14. The method of claim 12, where:
the first object is a vehicle and the second object is a loading bridge, or
the first object is the loading bridge and the second object is the vehicle.

15. The method of claim 12,
where the one or more characteristics of the one or more shapes include at least one of:
an outline of a shape of the one or more shapes,
an orientation of a shape of the one or more shapes,
a position of a first shape, of the one or more shapes, relative to a second shape of the one or more shapes,
a position of a shape, of the one or more shapes, relative to the portal,
a position of a shape, of the one or more shapes, on a surface of the first object,
a color of a shape of the one or more shapes,
a size of a shape of the one or more shapes, or
a pattern associated with a shape of the one or more shapes; and
where obtaining the one or more attributes of the first portal comprises:
obtaining, based on the one or more characteristics of the one or more shapes, the one or more attributes of the first portal.

16. The method of claim 12, where the one or more attributes of the portal include at least one of:
a size of the portal,
one or more dimensions of the portal,
a location of the portal on the surface of the first object, or
a curvature associated with the portal or the first object.

17. A non-transitory computer-readable medium storing instructions, the instructions comprising:
one or more instructions that, when executed by one or more processors, cause the one or more processors to:
identify one or more shapes depicted in one or more images,
the one or more shapes being associated with a first object that includes a first portal, and
the one or more shapes including a shape of a design on a surface of the first object,
the design including at least one of:
a logo, or
a name, and
the one or more shapes including one or more encoded decals;
obtain, from a data structure and based on at least one of the logo or the name, one or more attributes associated with the first portal,
wherein the data structure associates one or more characteristics associated with the at least one of the logo or the name with the one or more attributes of the first portal;
determine, based on the one or more attributes associated with the first portal, positioning information to be used to position a second portal of a second object relative to the first portal of the first object,
the positioning information indicating one or more control signals for moving the second object in a particular way;
determine the one or more control signals based on the positioning information; and
provide the one or more control signals to one or more actuators to automatically position the second portal relative to the first portal.

18. The non-transitory computer-readable medium of claim 17, where the one or more shapes further include at least one of:
a shape on a surface of the first object or the first portal,
a shape of the first portal, or
a shape of the first object.

19. The non-transitory computer-readable medium of claim 17, where the first object is a vehicle and the second object is a loading bridge to be positioned relative to the first portal of the vehicle.

20. The non-transitory computer-readable medium of claim 17, where the first object is a loading bridge and the second object is a vehicle to be positioned relative to the first portal of the loading bridge.

* * * * *